United States Patent
Hosoe et al.

(10) Patent No.: US 8,258,077 B2
(45) Date of Patent: Sep. 4, 2012

(54) HYDROGEN STORAGE MATERIAL AND METHOD FOR PRODUCING THE SAME

(75) Inventors: Mitsuya Hosoe, Wako (JP); Izuru Kanoya, Wako (JP); Hiroshi Sakai, Wako (JP); Terumi Furuta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 45 days.

(21) Appl. No.: 13/019,340

(22) Filed: Feb. 2, 2011

(65) Prior Publication Data

US 2011/0190119 A1    Aug. 4, 2011

(30) Foreign Application Priority Data

Feb. 3, 2010    (JP) .................. 2010-021905

(51) Int. Cl.
- B01J 20/02    (2006.01)
- C01B 3/06    (2006.01)
- C01B 3/08    (2006.01)

(52) U.S. Cl. ............ 502/406; 420/900; 423/658.2; 502/414

(58) Field of Classification Search ........... 502/414, 502/406; 420/900; 423/648.1, 658.2
See application file for complete search history.

(56) References Cited

U.S. PATENT DOCUMENTS

| | | | |
|---|---|---|---|
| 2003/0157018 A1* | 8/2003 | Zaluski et al. | 423/648.1 |
| 2005/0164878 A1 | 7/2005 | Morioka et al. | |
| 2005/0191235 A1* | 9/2005 | Vajo et al. | 423/657 |
| 2009/0025509 A1 | 1/2009 | Shinozawa et al. | |

FOREIGN PATENT DOCUMENTS

| | | |
|---|---|---|
| JP | 2004-018980 A | 1/2004 |
| JP | 2008-266781 A | 11/2008 |
| JP | 2009-30125 A | 2/2009 |

OTHER PUBLICATIONS

Konovalov, S. K. and Bulychev, B. M., "The P,T-State Diagram and Solid Phase Synthesis of Aluminium Hydride," Inorg. Chem. 1995, vol. 34, pp. 172-175, American Chemical Society, Washington, DC.

* cited by examiner

Primary Examiner — Wayne Langel
Assistant Examiner — Syed Iqbal
(74) Attorney, Agent, or Firm — Capitol City TechLaw, PLLC

(57) ABSTRACT

A crystalline Al phase and a crystalline $TiH_2$ phase each having a maximum length of 200 nm or less are dispersed in an amorphous phase containing an Al—Mg alloy to obtain a hydrogen storage material capable of reversibly storing and releasing hydrogen.

10 Claims, 17 Drawing Sheets

(LIGHT GRAY PORTION)

(DARK GRAY PORTION)

(BLACK PORTION)

(GRAY PORTION)

(BLACK PORTION a)

(BLACK PORTION b)

(BLACK PORTION c)

HYDROGEN STORAGE MATERIAL AND METHOD FOR PRODUCING THE SAME

CROSS-REFERENCE TO RELATED APPLICATION

This application is based upon and claims the benefit of priority from Japanese Patent Application No. 2010-021905 filed on Feb. 3, 2010, of which the contents are incorporated herein by reference.

BACKGROUND OF THE INVENTION

1. Field of the Invention

The present invention relates to a hydrogen storage material capable of reversibly storing or releasing hydrogen and a method for producing the same.

2. Description of the Related Art

Fuel-cell vehicles are equipped with a fuel cell for generating an electric power utilizing an electrochemical reaction between hydrogen and oxygen. Thus, a motor of the fuel-cell vehicle is actuated by the electric power from the fuel cell to generate a driving force for rotating tires.

The oxygen can be obtained from the air, and the hydrogen is generally supplied from a hydrogen storage vessel. Therefore, the fuel-cell vehicle is further equipped with the hydrogen storage vessel.

As the hydrogen storage vessel has a higher hydrogen storage capacity, the fuel-cell vehicle can be driven over a longer distance. However, when the fuel-cell vehicle contains an excessively large gas storage vessel, the vehicle disadvantageously has an increased weight, resulting in a high load on the fuel cell. From this viewpoint, various methods have been studied for increasing the hydrogen storage capacity of the hydrogen storage vessel while preventing the volume increase. In one of the methods, a hydrogen storage material is placed inside the vessel. For example, $AlH_3$, which can store hydrogen at a high ratio of approximately 10% by weight based on its own weight, is reported as an effective hydrogen storage material in Japanese Laid-Open Patent Publication No. 2004-018980 (particularly paragraphs [0060] to [0062]).

As shown in FIG. 17, a crystalline $AlH_3$ has a microstructure containing approximately square-shaped matrix phases 2 and a grain boundary phase 3 disposed therebetween. In this case, the matrix phases 2 have a side length t1 of approximately 100 μm, and the grain boundary phase 3 has a width w1 of several micrometers and occupies only a several volume percent of the structure. In an X-ray diffraction measurement of the crystalline $AlH_3$, a sharp peak of at least one of α, β, and γ phases is observed in the diffraction pattern.

It should be noted that the matrix phases 2 are composed of $AlH_3$ having a crystal lattice containing Al and H, and the grain boundary phase 3 is composed of a solid solution of H in an amorphous Al.

In the crystalline $AlH_3$ 1, hydrogen is stored in accordance with the following formula (1), while the stored hydrogen is released in accordance with the formula (2). The formulae (1) and (2) represent reactions in an arbitrary storage/release site, and do not mean that all sites of the crystalline $AlH_3$ 1 are oxidized and reduced.

$$Al + 3/2 H_2 \rightarrow AlH_3 \quad (1)$$

$$AlH_3 \rightarrow Al + 3/2 H_2 \quad (2)$$

The reaction of the formula (2) can be relatively readily induced, but that of the formula (1) cannot be readily induced.

As described in Japanese Laid-Open Patent Publication No. 2004-018980 (particularly paragraphs [0060] to [0062]), the hydrogen gas storage can be repeated only when the $AlH_3$ is doped with Ti and NaH and then ball-milled under a hydrogen pressure of 100 atm.

In addition, as described in Sergei K. Konovalov and Boris M. Bulychev, *Inorganic Chemistry*, 1995, 34, 172-175 (particularly page 173, right column, lines 26-28 and FIG. 2), when the Al is hydrogenated by $H_2$ gas contact in a gas-phase process, the contact has to be carried out under a high pressure of more than 2.5 GPa (about 25000 atm) at a temperature of 280° C. to 300° C. or under a further high pressure of 4 to 6 GPa at a temperature of 450° C. to 550° C.

As described above, the crystalline $AlH_3$ is notably disadvantageous in that it cannot readily store the hydrogen.

SUMMARY OF THE INVENTION

A general object of the present invention is to provide a hydrogen storage material capable of reversibly storing and releasing hydrogen.

A principal object of the present invention is to provide a hydrogen storage material capable of readily storing and releasing hydrogen.

Another object of the present invention is to provide a hydrogen storage material having a high hydrogen storage capacity and a method for producing the same.

A further object of the present invention is to provide a method for producing the hydrogen storage material.

According to an aspect of the present invention, there is provided a hydrogen storage material capable of reversibly storing and releasing hydrogen, comprising an amorphous phase containing an Al—Mg alloy and a crystalline Al phase and a crystalline $TiH_2$ phase each having a maximum length of 200 nm or less and dispersed in the amorphous phase.

The hydrogen storage material having such a structure can exhibit a high hydrogen storage capacity even under a relatively mild condition. In other words, the hydrogen storage material requires only a low energy for the hydrogen storage. In fact, in the hydrogen storage material of the present invention, the hydrogen storage can be started at a pressure of approximately 10 MPa (100 atm) and a temperature of approximately 60° C. In addition, the material can release hydrogen under this condition.

This is presumably because the amorphous phase has a volume larger than those of the other phases (i.e., the amorphous phase is used as a mother phase). When hydrogen is stored in the above crystalline $AlH_3$ (see FIG. 17), the hydrogen storage is started in the amorphous grain boundary phase as described above. Similarly, in the hydrogen storage material of the present invention, when the hydrogen storage is preferentially caused in the amorphous phase, since the amorphous phase is the mother phase having a volume larger than those of the other phases, it is presumed that the hydrogen storage material can exhibit a high hydrogen storage capacity even under the relatively mild condition.

Furthermore, as compared with materials using only Al, in the hydrogen storage material of the present invention, adsorption of the hydrogen molecules, dissociation of the adsorbed hydrogen molecules to hydrogen atoms, and diffusion of the dissociated hydrogen atoms into the amorphous phase are accelerated due to the presence of Mg. This increases the hydrogen storage capacity.

In addition, in the present invention, the $TiH_2$ acts to accelerate the adsorption of the hydrogen molecules to the hydrogen storage material and the release of the hydrogen molecules from the hydrogen storage material. Thus, the hydrogen storage material can store and release hydrogen even under the relatively mild condition.

When a metal particle having a maximum diameter of 500 nm or less is dispersed in the amorphous phase, the above effects can be further improved, so that the hydrogen storage capacity can be increased under a predetermined condition. The reason is thought to be that the metal particle has an activity for storing hydrogen.

In this case, the hydrogen storage material can store and release hydrogen even under a pressure of approximately 10 MPa (100 atm) and a room temperature (25° C.)

The metal particle may contain any component as long as it can show the above activity. Preferred examples of the components include Ni, Fe, Pd, and combinations of two or more thereof.

According to another aspect of the present invention, there is provided a method for producing a hydrogen storage material comprising a crystalline Al phase and a crystalline $TiH_2$ phase each having a maximum length of 200 nm or less and dispersed in an amorphous phase containing an Al—Mg alloy, comprising:

mixing $AlH_3$, $MgH_2$, and $TiH_2$ to prepare a mixed powder,
ball-milling the mixed powder in a hydrogen atmosphere for 60 to 600 minutes while applying a force of 5G to 30G (in which G is gravitational acceleration) to prepare a milled product, and
dehydrogenating the milled product to obtain the hydrogen storage material.

In this constitution, in ball milling, a great force of 5G to 30G is applied to the mixed powder of the the $AlH_3$, $MgH_2$, and $TiH_2$. By applying the force, the matrix structure of the $AlH_3$ and $MgH_2$ can be converted to the amorphous Al—Mg alloy phase, and the crystalline Al phase and the crystalline $TiH_2$ phase can be each distributed as a dispersed phase having a maximum length of 200 nm or less in the amorphous phase of the milled product.

Thus, in this constitution, the hydrogen storage material produced by applying the force to the mixed powder in ball milling can store a large amount of hydrogen under a relatively mild condition.

The ratio of the $AlH_3$ to the total of the $MgH_2$ and the $TiH_2$ in the mixed powder is not particularly limited. For example, the weight ratio of the $AlH_3$ to the total of the $MgH_2$ and the $TiH_2$ may be 55/45 to 95/5. The weight ratio of the $MgH_2$ to the $TiH_2$ is preferably 1/9 to 9/1.

As described above, when the metal particle having a maximum diameter of 500 nm or less is dispersed in the amorphous phase (the mother phase), the hydrogen storage capacity can be increased under a predetermined condition. In this case, the metal particle having a maximum diameter of 500 nm or less may be further added to when mixing the $AlH_3$, $MgH_2$, and $TiH_2$. Of course, the $AlH_3$, $MgH_2$, $TiH_2$, and metal particle may be mixed in random order.

In this case, the metal particle preferably contains Ni, Fe, Pd, or two or more thereof. The components are excellent in the effect of increasing the hydrogen storage capacity as described above.

In the case of adding the metal particle, the ratio of the $AlH_3$ to the total of the $MgH_2$, $TiH_2$, and metal particle in the mixed powder is not particularly limited. For example, the weight ratio of the $AlH_3$ to the total of the $MgH_2$, $TiH_2$, and metal particle may be 55/45 to 95/5.

As described above, in the present invention, since the amorphous phase containing Mg is used as the mother phase and the crystalline $TiH_2$ phase is dispersed in the mother phase, the hydrogen storage capacity can be increased even under the relatively mild condition. Thus, the hydrogen storage material of the present invention can exhibit a high hydrogen storage capacity even under low temperature and low pressure. This is presumably because the Mg acts to accelerate the incorporation (absorption) of the hydrogen, the $TiH_2$ acts to accelerate the adsorption of hydrogen to the hydrogen storage material and the release of hydrogen from the hydrogen storage material, and the hydrogen storage is preferentially caused in the amorphous phase (the mother phase) having a volume larger than those of the other phases.

Therefore, in a gas storage vessel containing the hydrogen storage material, it is unnecessary to form a heating device or a particular structure for improving the pressure resistance. As a result, the structure of the gas storage vessel can be simplified to reduce the equipment investment.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Several preferred embodiments of the hydrogen storage material and the production method of the present invention will be described in detail below with reference to the accompanying drawings.

Figure 1:
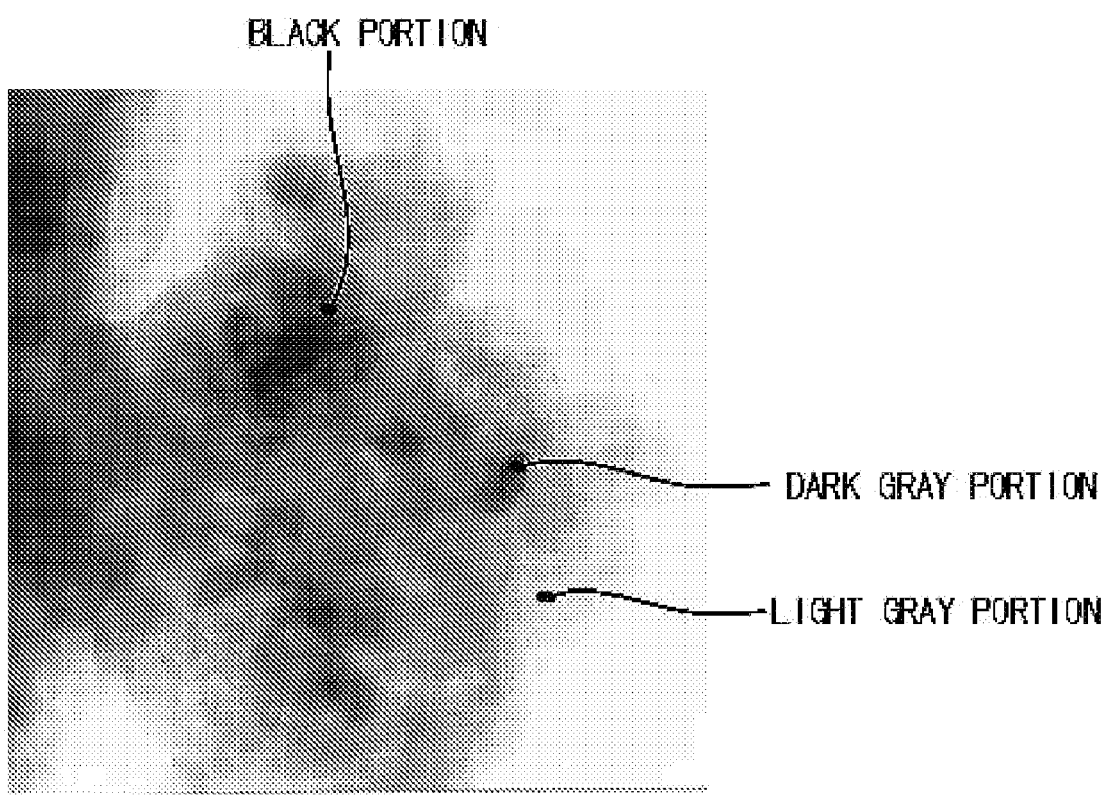
FIG. 1 is a transmission electron microscope (TEM) photograph of a hydrogen storage material according to a first embodiment of the present invention.

FIG. 1 is a transmission electron microscope (TEM) photograph of a hydrogen storage material according to a first embodiment of the present invention. As shown in FIG. 1, in the TEM analysis, most of the hydrogen storage material is composed of a light gray portion, and a dark gray (near-black) portion and a black portion are dispersed therein. The light gray portion corresponds to a mother phase, and the dark gray portion and the black portion each correspond to a dispersed phase.

Figure 2:
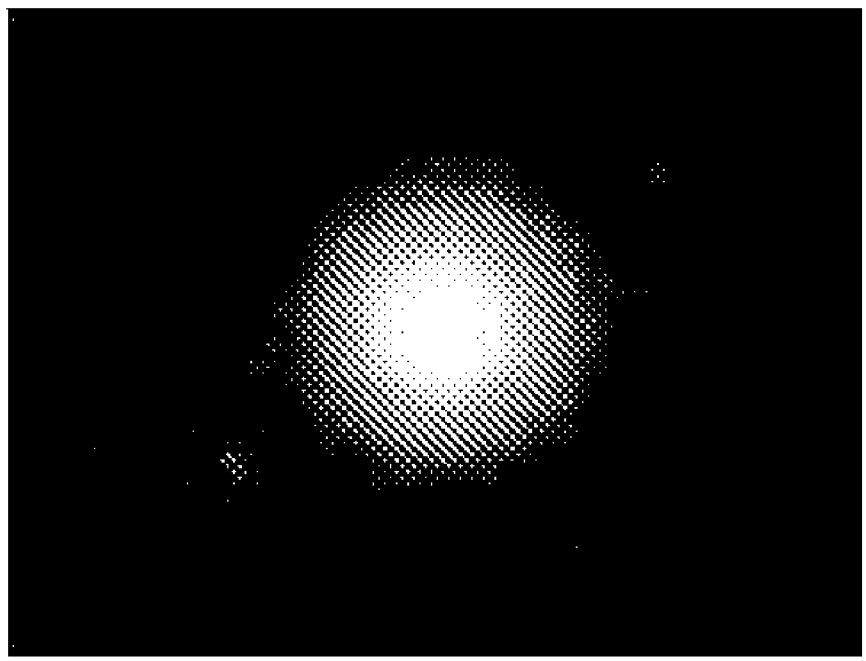
FIG. 2 is an electron beam diffraction image obtained by a selected-area analysis of a light gray portion shown in FIG. 1.

FIG. 2 is an electron beam diffraction image obtained by a selected-area analysis of the light gray portion. A halo pattern is shown in FIG. 2, so that the light gray portion is an amorphous phase. In addition, in an energy dispersive X-ray spectroscopy (EDS) of the light gray portion, the presence of Al and Mg is observed in the light gray portion. As made clear from the results, the light gray portion (i.e., the mother phase) is composed of an amorphous Al—Mg alloy phase.

Figure 3:
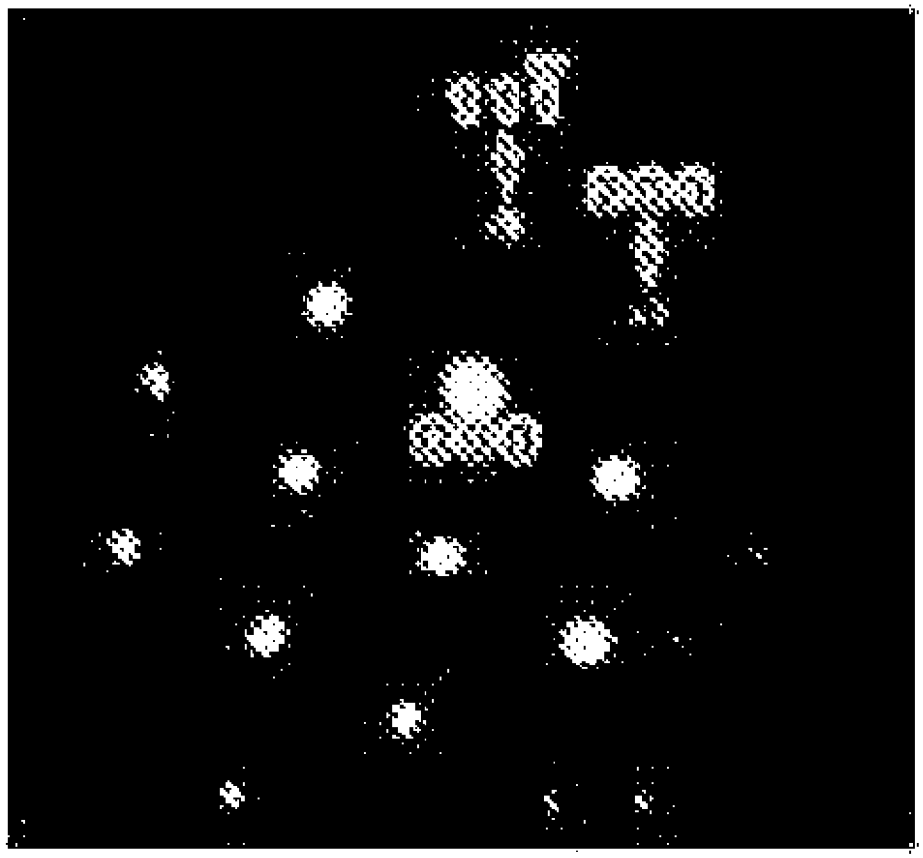
FIG. 3 is an electron beam diffraction image obtained by a selected-area analysis of a dark gray portion shown in FIG. 1.

As shown in FIG. 3, in a selected-area analysis of the dark gray portion, a clear spot pattern indicating the crystallinity is observed. In addition, in an EDS analysis, Al is observed in the portion. Thus, the dark gray portion is composed of a crystalline Al phase.

Figure 4:
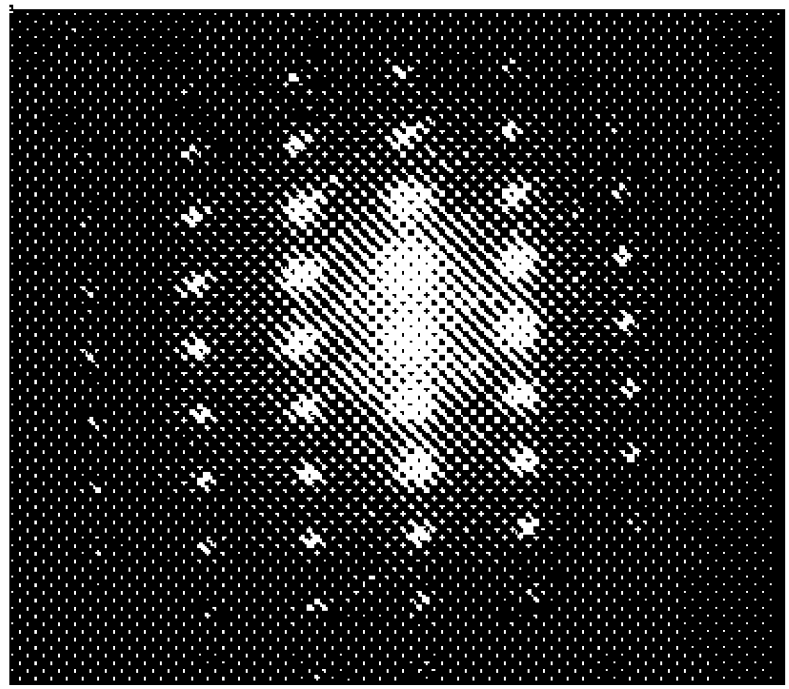
FIG. 4 is an electron beam diffraction image obtained by a selected-area analysis of a black portion shown in FIG. 1.

Similarly, as shown in FIG. 4, in a selected-area analysis of the black portion, a clear spot pattern indicating the crystallinity is observed. In addition, in an EDS analysis, the presence of Ti and H is observed in the black portion. Thus, the black portion is identified as a crystalline $TiH_2$ phase.

Therefore, the hydrogen storage material has a structure containing the mother phase of the amorphous Al—Mg alloy phase and the dispersed phases of the crystalline Al phase and the crystalline $TiH_2$ phase.

Figure 5:
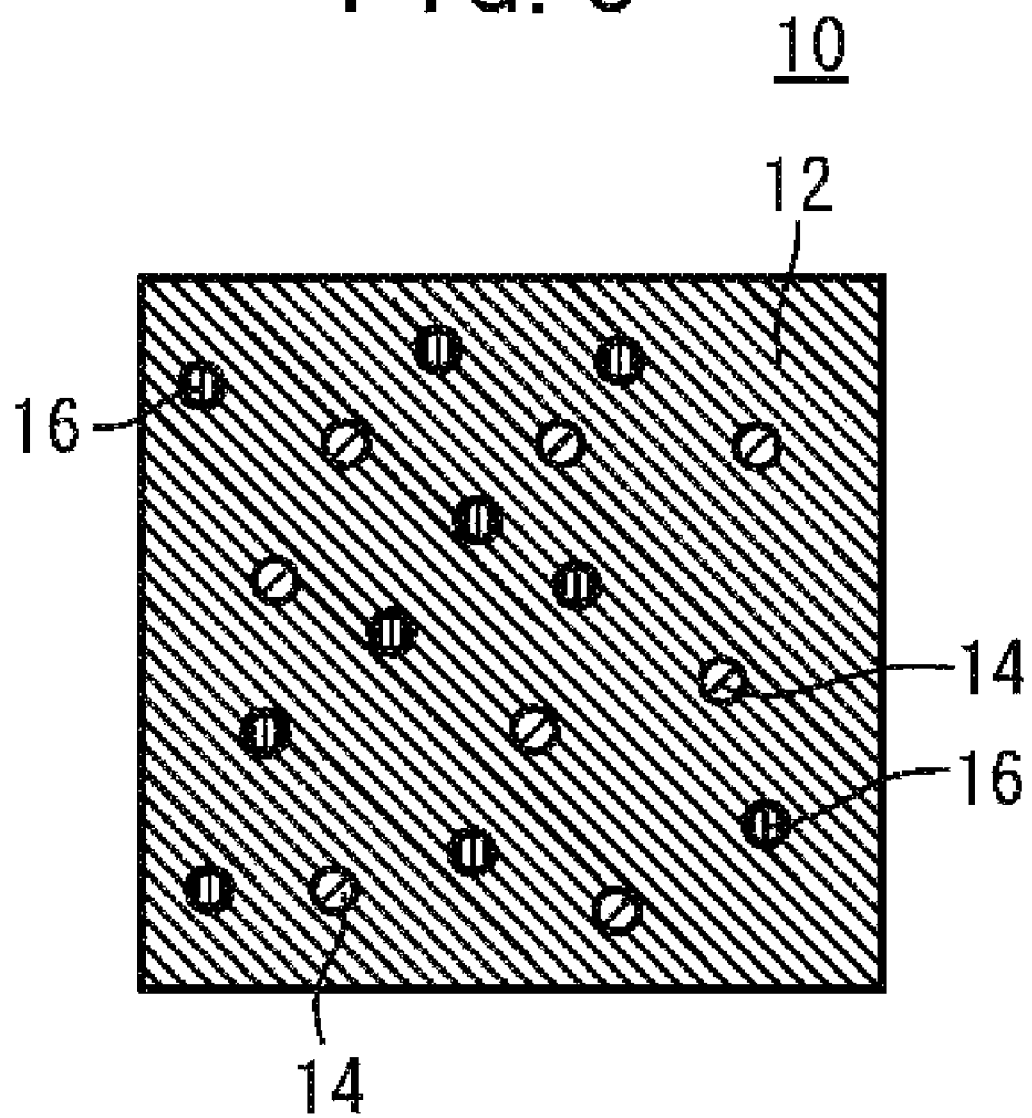
FIG. 5 is a schematic explanatory view showing a microstructure of the hydrogen storage material shown in FIGS. 1 to 4.

FIG. 5 is a schematic explanatory view showing a microstructure of a hydrogen storage material 10 having the light gray portion (the mother phase), the dark gray portion (the first dispersed phase) and the black portion (the second dispersed phase) shown in the above electron beam diffraction images. In FIG. 5, the referential numbers 12, 14, and 16 represent the mother phase, the first dispersed phase, and the second dispersed phase, respectively.

As described above, when hydrogen is stored in the crystalline $AlH_3$ 1 (see FIG. 17), the hydrogen storage is started in the amorphous grain boundary phase 3. Also in the hydrogen storage material 10 of the first embodiment, the hydrogen storage is considered to be started in the amorphous mother phase 12.

As is clear from FIGS. 1 and 5, in the hydrogen storage material 10 of the first embodiment, the amorphous mother phase 12 has a remarkably high volume ratio. Therefore, the hydrogen storage material 10 has a large hydrogen storage site, and thus has a significantly high hydrogen storage capacity.

In the mother phase 12, the Al and Mg are randomly distributed. Therefore, an energy required for hydrogenating Al in this hydrogen storage site can be lower than an energy required for hydrogenating Al into a crystalline $AlH_3$ in a gas-phase process. Thus, an energy required for storing hydrogen in the mother phase 12 can be lower than that required for storing hydrogen in the crystalline $AlH_3$. As a result, the hydrogen storage material 10 can readily store hydrogen.

The mother phase 12 contains the Mg. The amorphous phase containing the Al—Mg alloy can more readily adsorb hydrogen molecules as compared with amorphous phases containing only Al. In addition, the amorphous Al—Mg alloy phase is more excellent in the dissociation of the hydrogen molecules into hydrogen atoms and the diffusion of the dissociated hydrogen atoms to the inside. Thus, the process from the hydrogen adsorption onto the mother phase 12 to the hydrogen incorporation (storage) is accelerated due to the presence of the Mg.

In addition, the $TiH_2$ in the second dispersed phase 16 acts to accelerate the adsorption of the hydrogen molecules to the hydrogen storage material 10 and the release of the hydrogen molecules from the hydrogen storage material 10.

Figure 17:
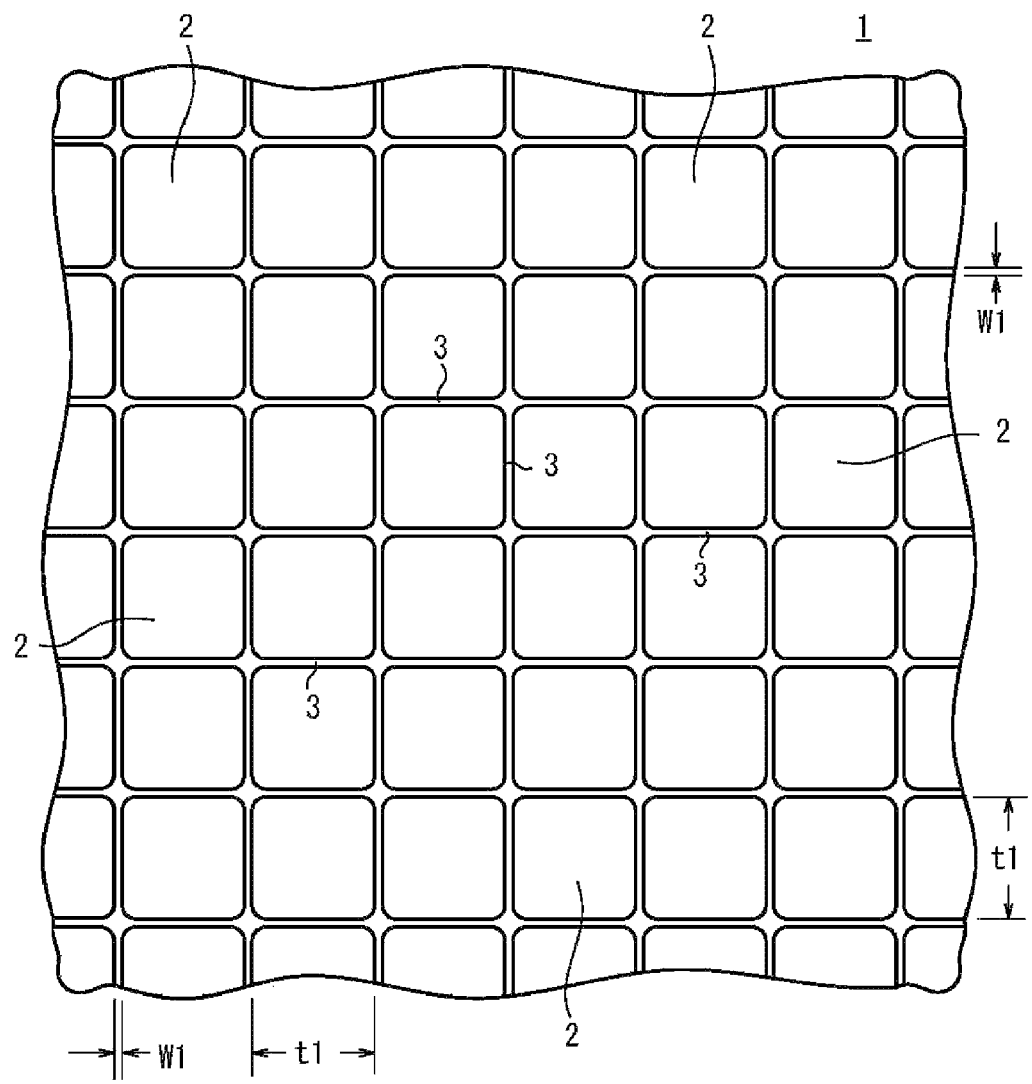
FIG. 17 is a schematic explanatory view showing a microstructure of a crystalline $AlH_3$.

For the above reasons, as compared with the crystalline $AlH_3$ 1 shown in FIG. 17, the hydrogen storage material 10 can store a larger amount of hydrogen even under a relatively mild condition at a hydrogen pressure of approximately 10 MPa (100 atm) and a temperature of approximately 60° C. In addition, it is unnecessary to subject the hydrogen storage material 10 to a ball milling treatment for storing hydrogen.

The first dispersed phase 14 (the crystalline Al phase) and the second dispersed phase 16 (the crystalline $TiH_2$ phase) each have a maximum length of 200 nm or less. In other words, the hydrogen storage material 10 does not contain a first dispersed phase 14 or a second dispersed phase 16 having a length of more than 200 nm, which is measured in a two-dimensional plane.

The hydrogen storage material 10 may be produced as follows.

$AlH_3$ is synthesized first.

For example, $AlH_3$ may be obtained by dissolving $AlCl_3$ in a diethyl ether solution of $LiAlH_4$ to carry out a reaction therebetween at ambient temperature. LiCl generated in the reaction is removed by filtration, and the filtrate is exposed to reduced pressure using a vacuum pump or the like at room temperature to evaporate diethyl ether. Then, the residue is dried under reduced pressure at a temperature of 40° C. to 80° C. to obtain a solid powder of $AlH_3$. At this point, the $AlH_3$ is composed of a crystalline $AlH_3$.

Then, the $AlH_3$ powder is mixed with $MgH_2$ powder and a $TiH_2$ powder to prepare a mixed powder. The $MgH_2$ powder and $TiH_2$ powder are easily commercially available.

The ratio between the $MgH_2$ and $TiH_2$ is not particularly limited, and the weight ratio of the $MgH_2$ to the $TiH_2$ may be 1/9 to 9/1. Also the ratio between the $AlH_3$ and the total of the $MgH_2$ and $TiH_2$ is not particularly limited, and the weight ratio of the $AlH_3$ to the total of the $MgH_2$ and $TiH_2$ may be 55/45 to 95/5.

The mixed powder is ball-milled in a hydrogen gas atmosphere while applying a force of 5G to 30G (in which G is gravitational acceleration). Specifically, the mixed powder is enclosed in a pot together with a crushing ball in the hydrogen atmosphere such that the internal hydrogen pressure of the pot is 0.1 to 2 MPa.

Then, the pot is fixed between a press shaft and a rotatable table, which is disposed rotatably on a disc-shaped base plate of a planetary ball milling apparatus, and the disc-shaped base plate and the rotatable table are both rotated.

In the planetary ball milling apparatus, the pot is rotated orbitally by rotation of the disc-shaped base plate and rotated on its axis by the rotatable table. Thus, the pot is rotated orbitally around a rotary shaft connected to the disc-shaped base plate, and is rotated on its axis around the press shaft. The force is applied to the mixed powder in the pot by the orbital motion and the axis motion. The inside of the pot is kept under the hydrogen atmosphere during the ball milling to prevent generation of an undesired compound such as magnesium alanate $Mg(AlH_4)_2$, whereby the amorphous phase containing the Al—Mg alloy can be obtained.

The force of 5G to 30G can be applied by controlling the rotation speed of the disc-shaped base plate or the rotatable table, the treatment time, etc. For example, when the pot has a diameter of 80 mm, a height of 100 mm, and an internal volume of 80 ml, and the disc-shaped base plate has a diameter of about 300 mm, the rotation speed of the disc-shaped base plate (the orbital motion) may be 50 to 500 rpm, the rotation speed of the rotatable table (the axis motion) may be 30 to 1000 rpm, and both of the orbital motion and the axis motion may be carried out for 60 to 600 minutes.

In this embodiment, a high energy is applied to the crystalline $AlH_3$, $MgH_2$, and $TiH_2$ in this manner. As a result, the matrix structure of the crystalline $AlH_3$ and $MgH_2$ is converted to the amorphous Al—Mg alloy phase, and the crystalline Al phase and the crystalline $TiH_2$ phase each having a maximum length of 200 nm or less are distributed as the first dispersed phase 14 and the second dispersed phase 16 in the amorphous phase (the mother phase 12) of the obtained milled product.

When the force applied in the ball milling is less than 5G (the milling time is less than 60 minutes under the above condition), the above described microstructure cannot be satisfactorily formed. On the other hand, when the force is more than 30G (the milling time is more than 600 minutes under the above condition), the amorphous phase is often converted to the crystalline phase, so that the mother phase 12 may contain a large amount of the crystalline phase needing a high energy in the hydrogen storage.

Then, the milled product is subjected to a dehydrogenation treatment to form the hydrogen storage sites, whereby the hydrogen storage material 10 shown in FIGS. 1 to 4 is obtained. In an X-ray diffraction measurement of the hydrogen storage material 10, peaks of the Al and $TiH_2$ are observed.

Figure 6:
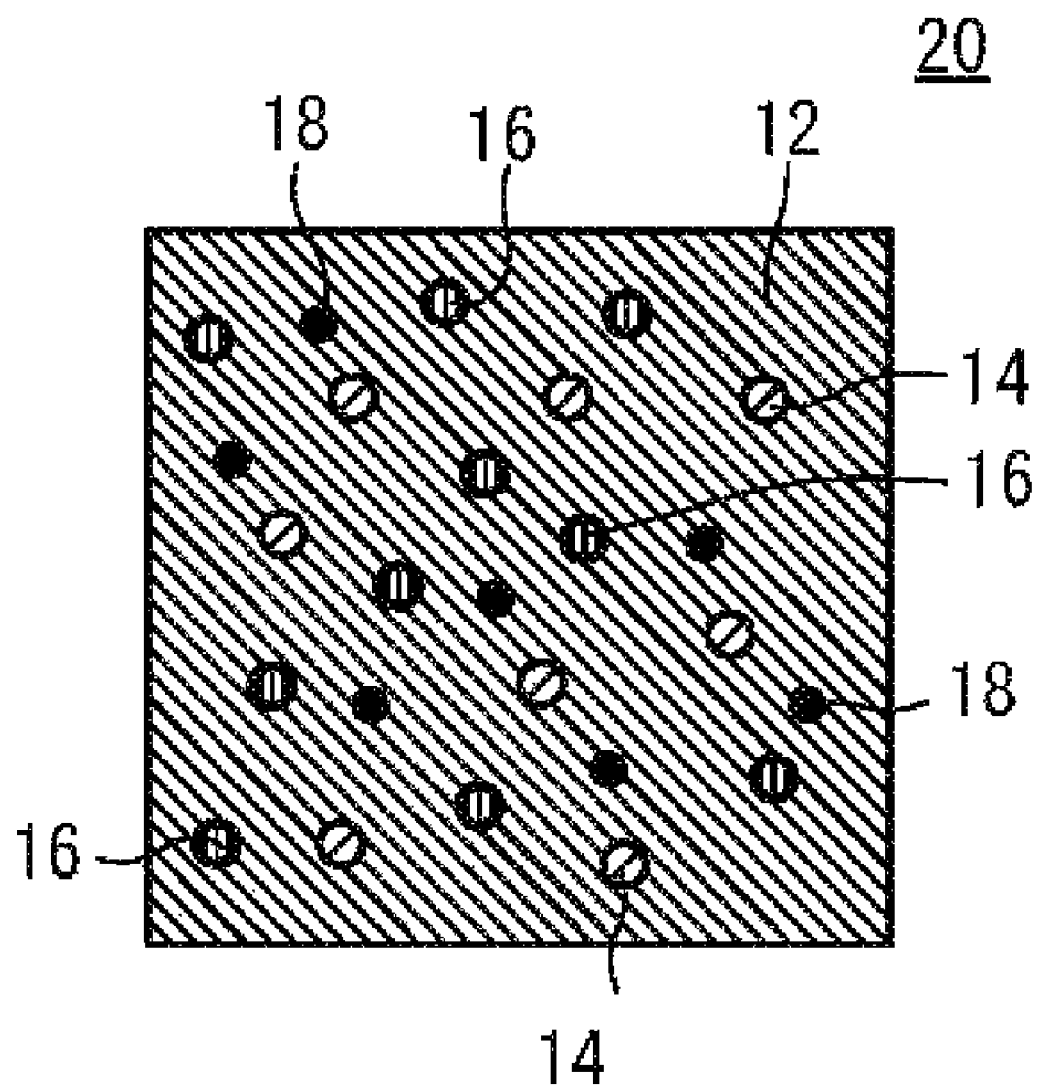
FIG. 6 is a schematic explanatory view showing a microstructure of a hydrogen storage material according to a second embodiment of the present invention.
Figure 7:
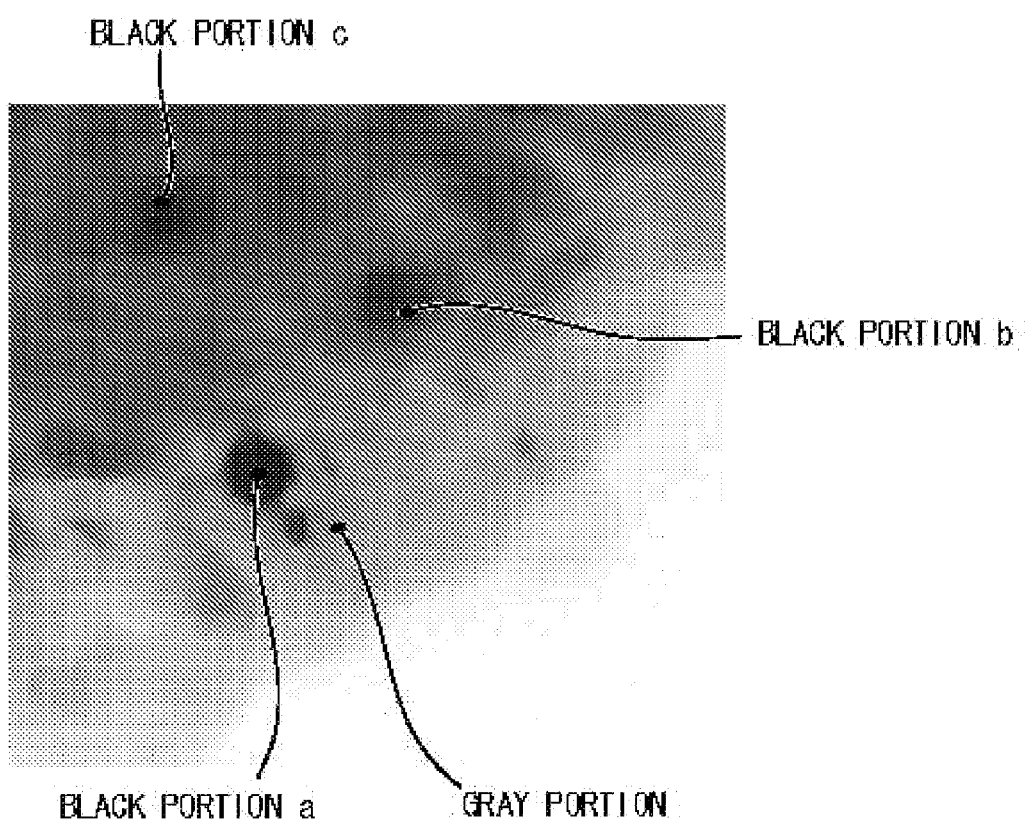
FIG. 7 is a TEM photograph of the hydrogen storage material shown in FIG. 6.

As shown in the schematic explanatory structure view of FIG. 6 and the TEM photograph of FIG. 7, a hydrogen storage material 20 according to a second embodiment may contain, in addition to the mother phase 12, the first dispersed phase 14, and the second dispersed phase 16, metal particles 18 dispersed in the mother phase 12. The hydrogen storage material 20 of the second embodiment will be described below.

The metal particle 18 can be dispersed in the mother phase 12 by adding the metal particle 18 in the preparation of the mixed powder of the $AlH_3$, $MgH_2$, and $TiH_2$ and by performing the ball milling under the above condition.

Figure 8:
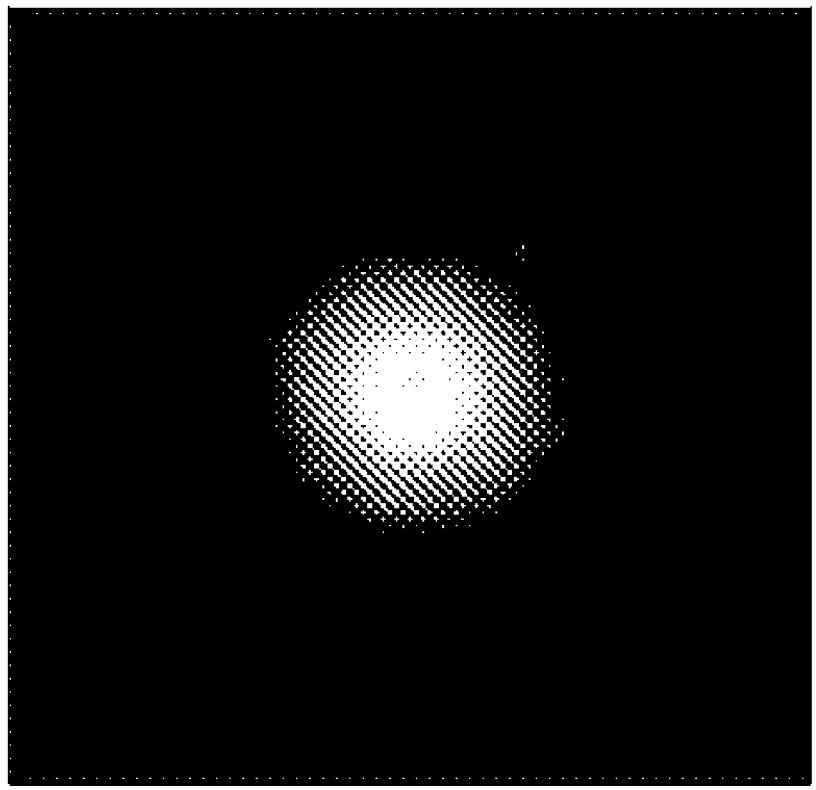
FIG. 8 is an electron beam diffraction image obtained by a selected-area analysis of a gray portion shown in FIG. 7.

FIG. 8 is an electron beam diffraction image obtained by a selected-area analysis of the mother phase 12 shown as a gray portion in FIG. 7. A halo pattern is shown in FIG. 8, so that the mother phase 12 is an amorphous phase also in this embodiment. In addition, in an energy dispersive X-ray spectroscopy (EDS) of the light gray portion, the presence of Al and Mg is observed in the portion.

Figure 9:
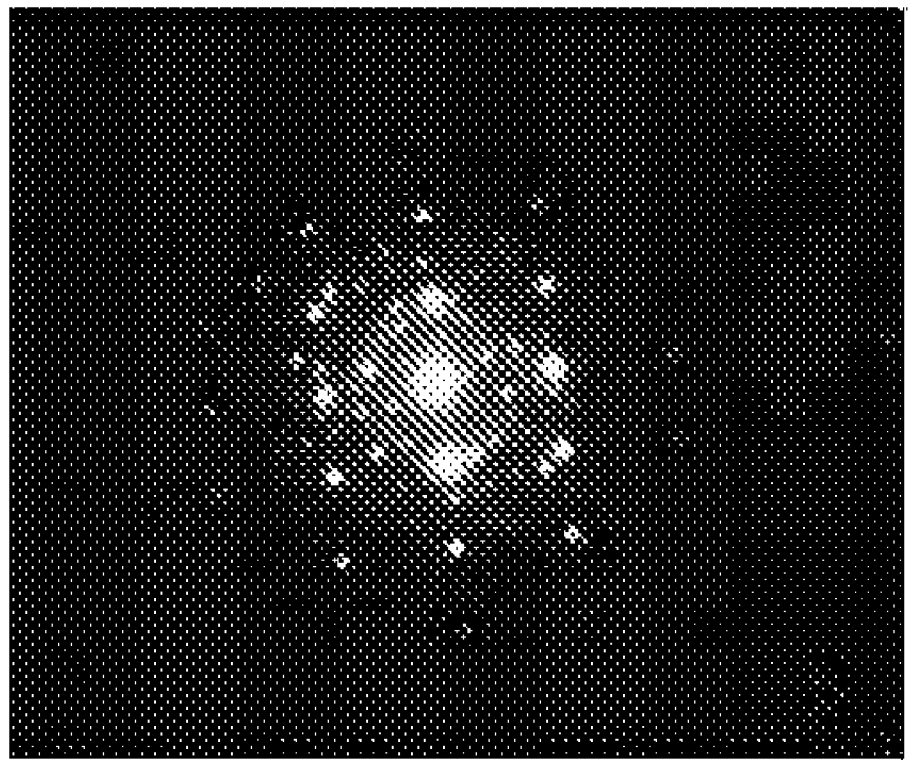
FIG. 9 is an electron beam diffraction image obtained by a selected-area analysis of a black portion "a" shown in FIG. 7.
Figure 10:
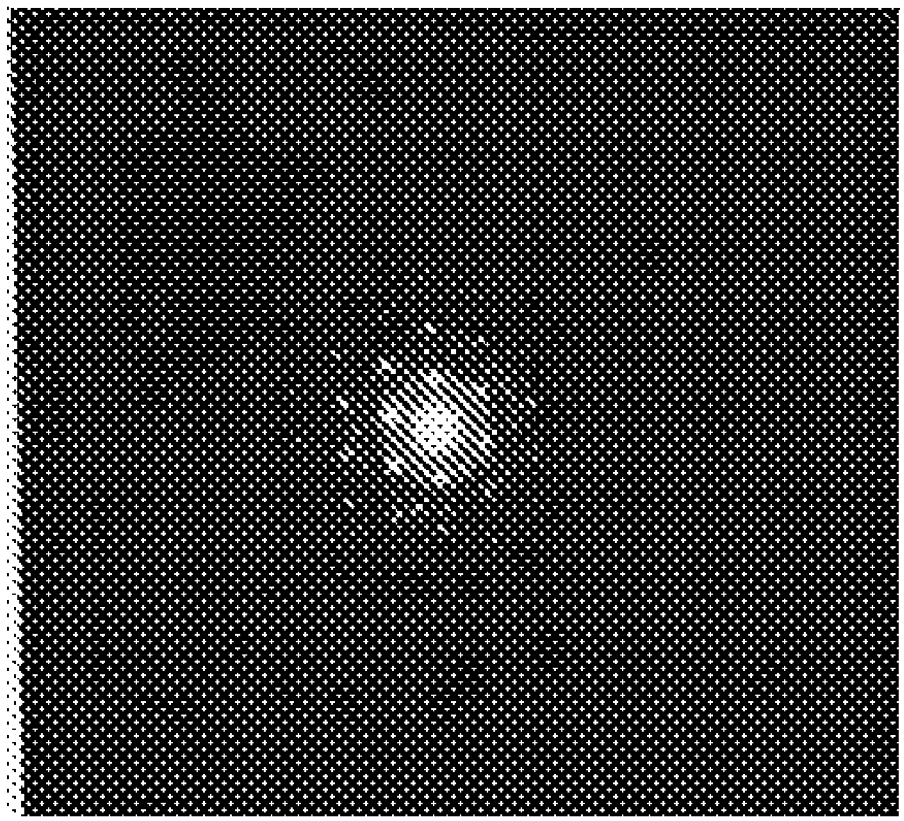
FIG. 10 is an electron beam diffraction image obtained by a selected-area analysis of a black portion "b" shown in FIG. 7.
Figure 11:
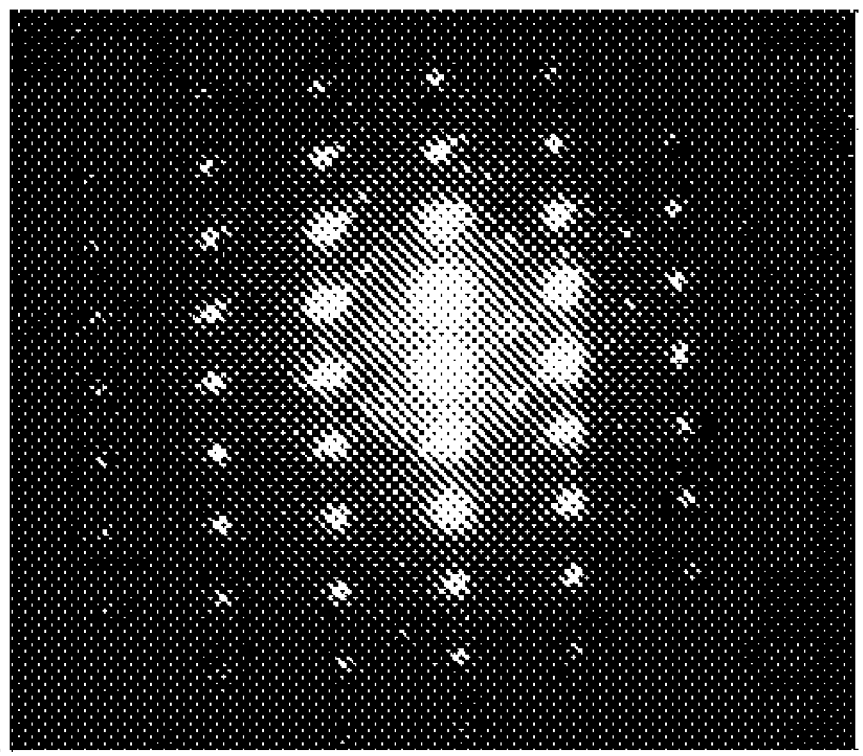
FIG. 11 is an electron beam diffraction image obtained by a selected-area analysis of a black portion "c" shown in FIG. 7.

On the other hand, as shown in FIGS. 9 to 11, in a selected-area analysis of each of black portions a, b, and c shown in FIG. 7, a clear spot pattern is observed. In addition, in an EDS analysis, the presence of a metal added as the metal particle, Al, and $TiH_2$ is observed in the black portions a, b, and c, respectively, as shown in FIGS. 9 to 11.

The metal particle 18 is not particularly limited, and preferably contains Ni, Fe or Pd. The metals can significantly accelerate the adsorption of hydrogen molecules, the dissociation to hydrogen atoms, and the diffusion into the mother phase 12. The metals are particularly excellent in activity for dissociating the adsorbed hydrogen molecules to the hydrogen atoms. Furthermore, the metals can advantageously accelerate the formation of the amorphous Al—Mg alloy phase in the ball milling of the mixed powder containing the $AlH_3$ and $MgH_2$.

Of course, two or more of Ni, Fe and Pd may be used together in the metal particle 18.

The metal particle 18 has a maximum diameter of 500 nm or less. When the maximum diameter is more than 500 nm, the activity on the above described adsorption, dissociation and diffusion may be deteriorated.

The maximum diameter of the metal particle 18 may be 1 nm or more, because it is difficult to prepare the metal particle 18 with an excessively small diameter. It is particularly preferred that the metal particle 18 has a maximum diameter of 1 to 100 nm from the viewpoints of availability and activity.

Example 1

13 g of $AlCl_3$ was added to and dissolved in 300 ml of a diethyl ether solution containing 1 mol/l of $LiAlH_4$, and was reacted at the ambient temperature until gas generation stopped. Then, LiCl precipitated in the solution was removed by filtration, and the filtrate was exposed to reduced pressure for 1 hour using a vacuum pump to evaporate diethyl ether. The residue was dried under reduced pressure for 1 hour at each temperature of 40° C., 60° C. and 80° C., to obtain 2 g of a particulate synthetic product. The steps were repeated to prepare 6 g of $AlH_3$ particles in total.

0.7 g of the prepared $AlH_3$ particles were mixed with 0.1 g of $MgH_2$ and 0.2 g of $TiH_2$ in an agate mortar to prepare a mixed powder. In the mixed powder, the weight ratio of the $AlH_3$:the $MgH_2$:the $TiH_2$ was 7:1:2.

The mixed powder was enclosed together with a crushing ball in a pot having an outer diameter of 80 mm, a height of 100 mm, and an internal volume of 80 ml. In this step, the enclosure was carried out in a hydrogen atmosphere, and hydrogen was introduced to the pot such that the internal hydrogen pressure of the pot was 1.5 MPa.

The pot was sandwiched between a press shaft and a rotatable table on a disc-shaped base plate of a planetary ball milling apparatus (manufactured by Fritsch, Germany), and subjected to a ball milling treatment. The disc-shaped base plate had a diameter of 300 mm, and the rotation speed thereof was 350 rpm. The rotation speed of the rotatable table (i.e. the speed of rotation of the pot on its axis) was 800 rpm, and the ball milling time was 300 minutes. A force of 16G was applied to the mixed powder under the condition.

The ball-milled powder was dehydrogenated to produce a final product. The final product was subjected to an X-ray diffraction measurement using an X-ray diffractometer manufactured by Bruker. The X-ray diffraction pattern of the final product is shown in FIG. 12.

Figure 12:
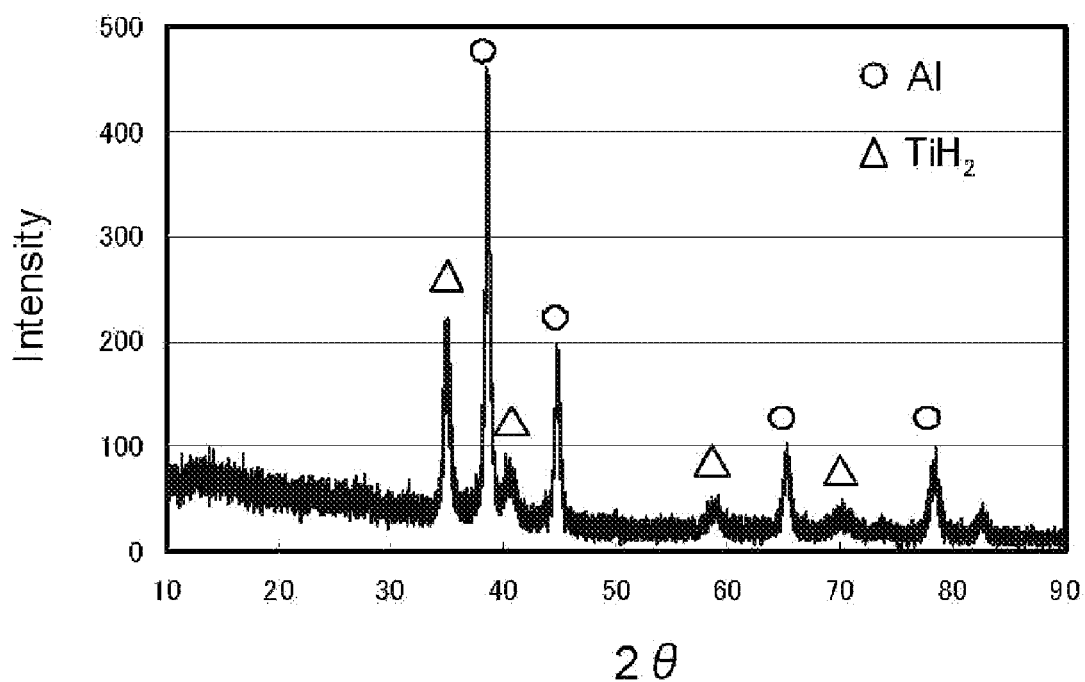
FIG. 12 is an X-ray diffraction pattern of a final product obtained in Example 1.

As shown in FIG. 12, only peaks of Al and $TiH_2$ were observed, and peaks of Mg, $AlH_3$, and $MgH_2$ were not observed. This means that a crystalline Mg, a crystalline Al—Mg alloy, $AlH_3$, and $MgH_2$ were not contained in the final product.

A TEM photograph of the final product is shown in FIG. 1. Incidentally, the acceleration voltage was 200 kV.

As described above, the electron beam diffraction image obtained by the selected-area analysis of the light gray portion of FIG. 1 is shown in FIG. 2, and the electron beam diffraction images obtained by the selected-area analysis of the dark gray portion and the black portion are shown in FIGS. 3 and 4 respectively. It is clear from FIGS. 2 to 4 that the light gray portion (the mother phase) was an amorphous phase, and the dark gray portion (the first dispersed phase) and the black portion (the second dispersed phase) were crystalline phases.

In an EDS analysis, the presence of Al and Mg was observed in the light gray portion (the mother phase), the presence of Al was observed in the dark gray portion (the first dispersed phase), and the presence of $TiH_2$ was observed in the black portion (the second dispersed phase). It is clear from the results that the final product contained the crystalline Al phase (the first dispersed phase) and the crystalline $TiH_2$ phase (the second dispersed phase) in the amorphous Al—Mg alloy phase (the mother phase).

Furthermore, TEM photographs of various areas of the final product were analyzed. As a result, in the crystalline Al phases (the first dispersed phases) distributed as islands in the amorphous phase, the maximum length measured in a two-dimensional plane fell generally within a range of 5 to 50 nm and at most 200 nm.

Meanwhile, in the crystalline $TiH_2$ phases (the second dispersed phases) distributed as islands in the amorphous phase, the maximum length measured in a two-dimensional plane was generally within a range of 20 to 100 nm and at most 200 nm.

Figure 13:
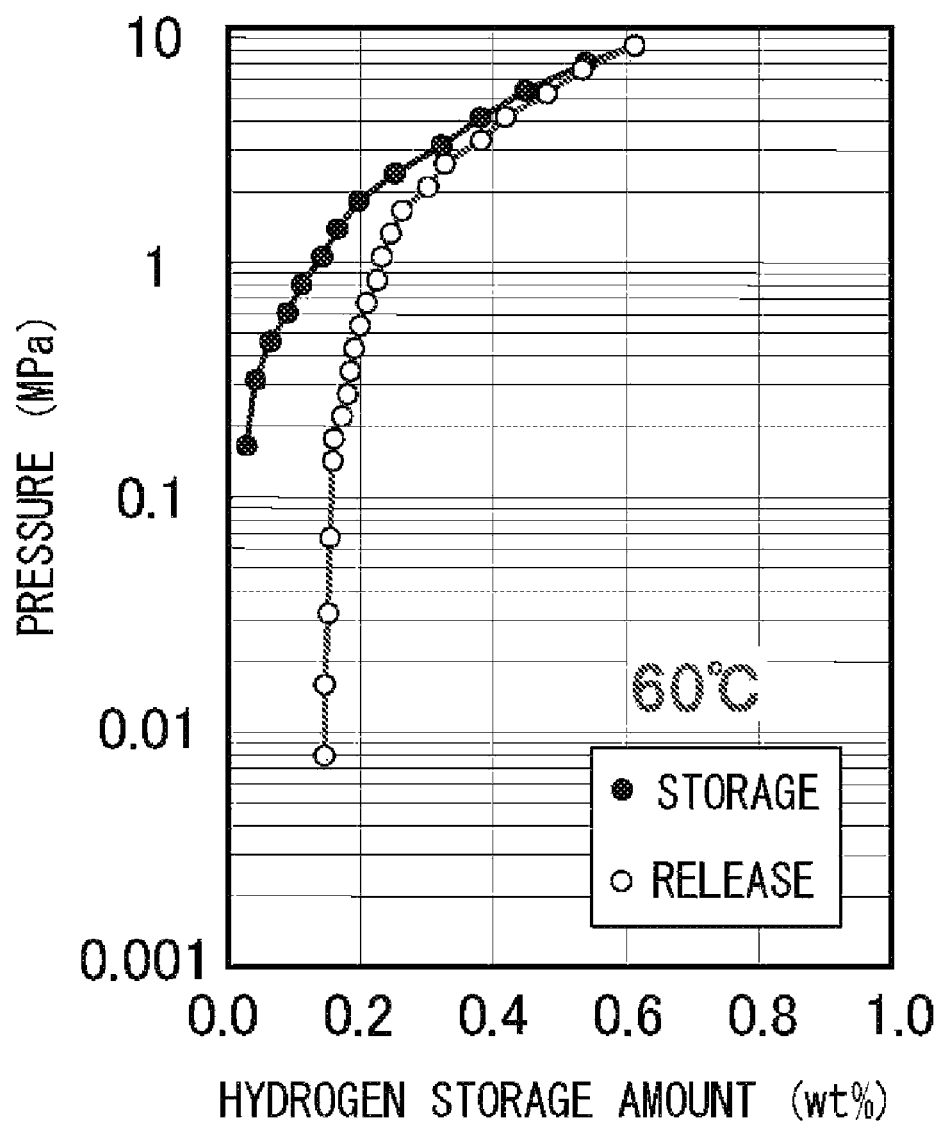
FIG. 13 is a graph showing results of a hydrogen storage/release measurement (a PCT measurement) of the final product.

Then, 0.3 g of the final product was subjected to a hydrogen storage/release measurement (a PCT measurement) under an applied hydrogen pressure of vacuum to 10 MPa, a measurement temperature of 60° C., and a convergence time of 30 minutes. The results are shown in FIG. 13. It is clear from FIG. 13 that the final product stored about 0.62% by weight of hydrogen at a relatively low pressure of 9 MPa.

The hydrogen was repeatedly stored even at a low pressure, the amount of the repeatedly stored hydrogen increased with the pressure increase, and a plateau was not formed. Therefore, it was presumed that the hydrogen storage was caused not by $AlH_3$ formation but by a solid solution of hydrogen in the amorphous phase (the mother phase).

Furthermore, as shown in FIG. 13, the final product stored hydrogen even under a hydrogen pressure of approximately 10 MPa (100 atm) and a temperature of approximately 60° C., and released hydrogen under the same condition. It is clear from the results that the final product was an excellent hydrogen storage material capable of reversibly storing and releasing hydrogen.

Example 2

0.7 g of the $AlH_3$ particles prepared in Example 1 were weighed and mixed with 0.1 g of $MgH_2$, 0.17 g of $TiH_2$, and 0.03 g of fine Fe particles having a diameter of 10 to 30 nm in an agate mortar to prepare a mixed powder. In the mixed powder, the weight ratio of $AlH_3/MgH_2/TiH_2/Fe$ was 7/1/1.7/0.3.

Figure 14:
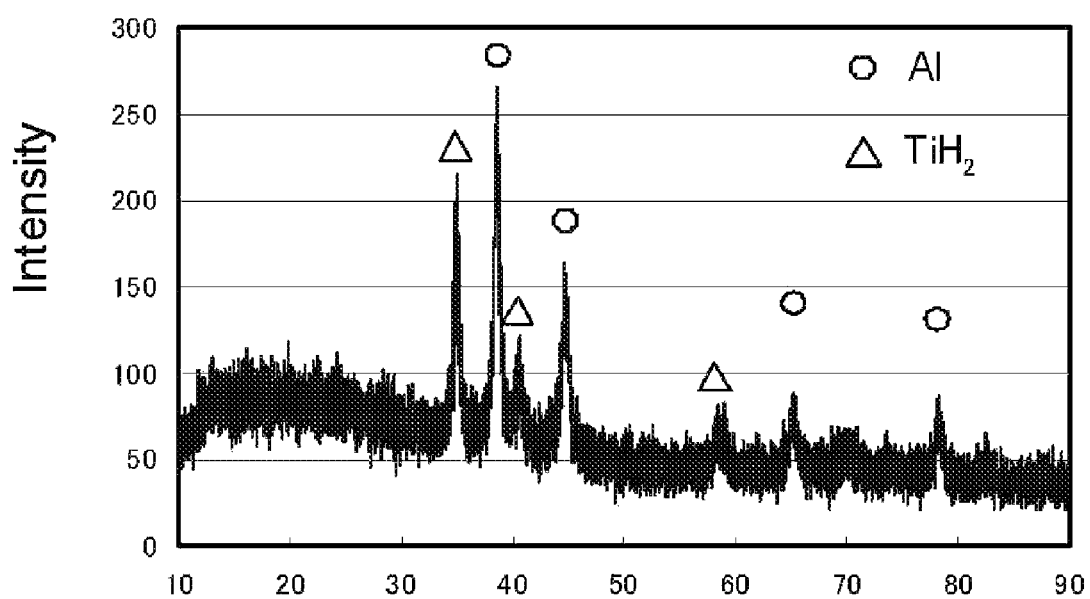
FIG. 14 is an X-ray diffraction pattern of a final product obtained in Example 2.

Then, the mixed powder was ball-milled in the same manner as Example 1, and the milled powder was dehydrogenated, to produce a final product of Example 2. The X-ray diffraction pattern of the final product is shown in FIG. 14. As a result, also in this example, only peaks of Al and $TiH_2$ were observed, and peaks of Mg, Fe, $AlH_3$, and $MgH_2$ were not observed. This means that a crystalline Mg, a crystalline Fe, a crystalline Al—Mg alloy, $AlH_3$, and $MgH_2$ were not contained in the final product.

A TEM photograph of the final product is shown in FIG. 7. Incidentally, the acceleration voltage was 200 kV in the same manner as above.

As described above, the electron beam diffraction image obtained by the selected-area analysis of the gray portion of FIG. 7 is shown in FIG. 8, and the electron beam diffraction images obtained by the selected-area analysis of the black portions a, b, and c are shown in FIGS. 9 to 11, respectively. It is clear from FIGS. 8 to 11 that the gray portion (the mother phase) was an amorphous phase, and the black portion a (the metal particle), the black portion b (the first dispersed phase), and the black portion c (the second dispersed phase) were crystalline phases.

In an EDS analysis, the presence of Al and Mg was observed in the gray portion (the mother phase), the presence of Fe was observed in the black portion a (the metal particle), the presence of Al was observed in the black portion b (the first dispersed phase), and the presence of $TiH_2$ was observed in the black portion c (the second dispersed phase). It is clear from the results that the final product contained the fine Fe particle (the metal particle), the crystalline Al phase (the first dispersed phase), and the crystalline $TiH_2$ phase (the second dispersed phase) in the amorphous Al—Mg alloy phase (the mother phase).

Furthermore, TEM photographs of various areas of the final product were analyzed. As a result, in the crystalline Al phases (the first dispersed phases) distributed as islands in the amorphous phase, the maximum length of measured in a two-dimensional plane generally fell within a range of 5 to 50 nm and was at most 200 nm.

The crystalline $TiH_2$ phases (the second dispersed phases) were also distributed as islands in the amorphous phase. The maximum length of the crystalline $TiH_2$ phases measured in a two-dimensional plane generally fell within a range of 20 to 100 nm and was at most 200 nm.

In addition, the fine Fe particles in the final product had approximately the same diameters as those added in the mixing step. The diameters were generally within a range of 10 to 30 nm.

Then, 0.3 g of the final product was subjected to a PCT measurement under an applied hydrogen pressure of vacuum to 10 MPa, a measurement temperature of the room temperature 25° C. or 60° C., and a convergence time of 30 minutes. The results obtained at the room temperature are shown in FIG. 15, and the results obtained at 60° C. are shown in FIG. 16.

Figure 15:
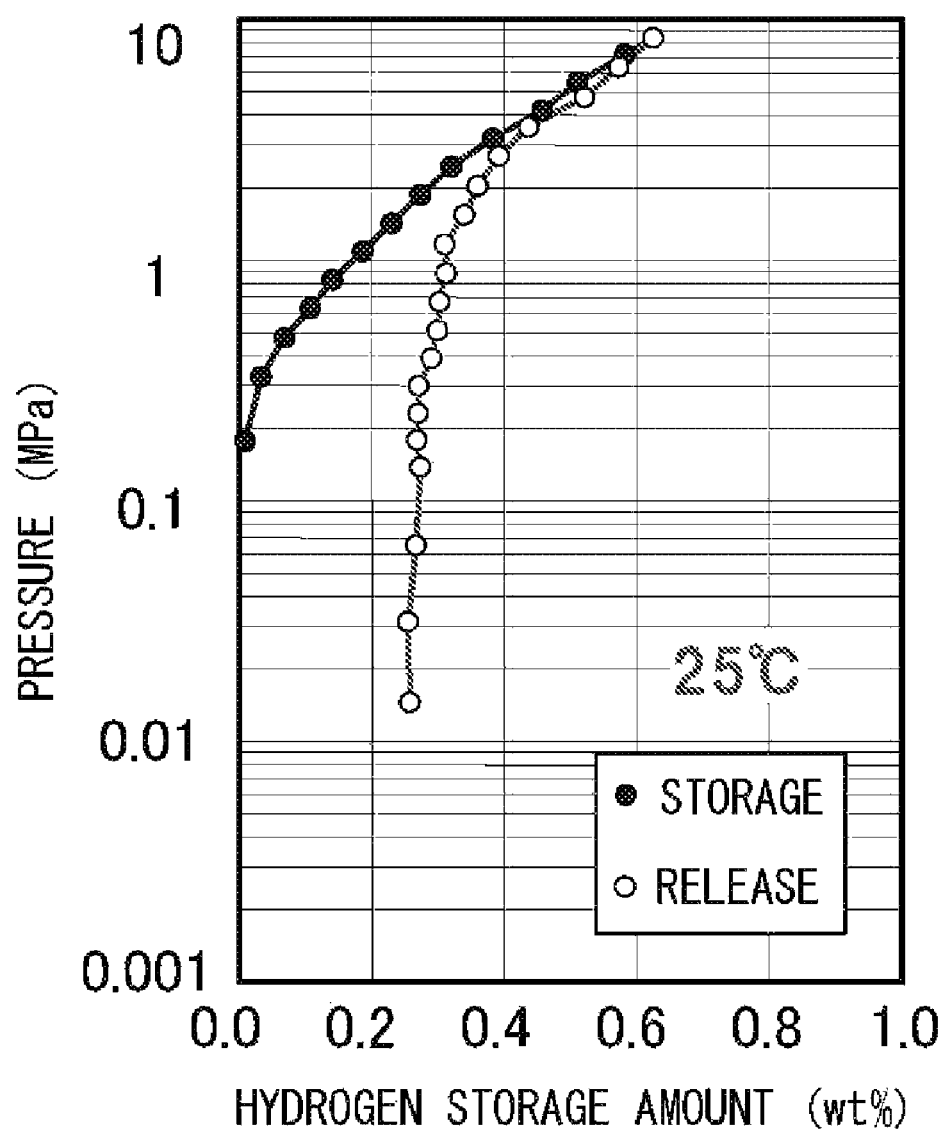
FIG. 15 is a graph showing results of a PCT measurement of the final product at 25° C.
Figure 16:
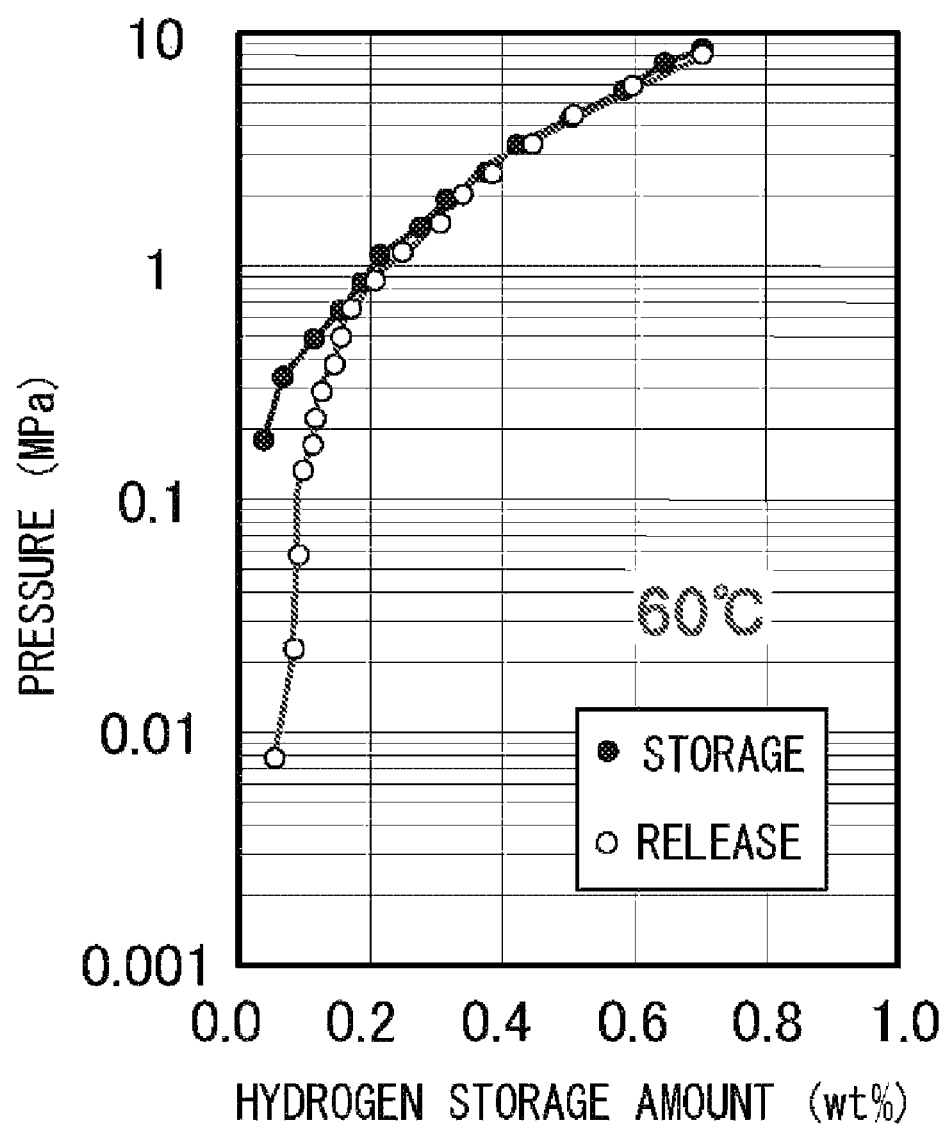
FIG. 16 is a graph showing results of a PCT measurement of the final product at 60° C.

It is clear from FIGS. 15 and 16 that the final product stored a significantly large amount (about 0.62% or 0.7% by weight) of hydrogen under a relatively low pressure of 9 MPa and a relatively low temperature of the room temperature or 60° C. As is clear from this, the hydrogen storage amount could be further increased by dispersing the fine Fe particles in the mother phase.

In Example 2, as well as in Example 1, the hydrogen was repeatedly stored at a low pressure, the amount of the repeatedly stored hydrogen increased with the pressure increase, and a plateau was not formed. Therefore, it was presumed that the hydrogen storage was caused not by $AlH_3$ formation but by a solid solution of hydrogen in the amorphous phase (the mother phase).

Furthermore, as shown in FIGS. 15 and 16, the final product stored hydrogen even under a hydrogen pressure of approximately 10 MPa (100 atm) and a temperature of the room temperature or approximately 60° C., and released hydrogen under the same condition. It is clear from the results that the final product was an excellent hydrogen storage material capable of reversibly storing and releasing hydrogen.

Although certain preferred embodiments of the present invention have been shown and described in detail, it should be understood that various changes and modifications may be made therein without departing from the scope of the appended claims.

What is claimed is:

1. A hydrogen storage material capable of reversibly storing and releasing hydrogen, comprising
an amorphous phase containing an Al—Mg alloy and
a crystalline Al phase and a crystalline $TiH_2$ phase each having a maximum length of 200 nm or less and dispersed in the amorphous phase.

2. The hydrogen storage material according to claim 1, further comprising a metal particle having a maximum diameter of 500 nm or less and dispersed in the amorphous phase.

3. The hydrogen storage material according to claim 2, wherein the metal particle contains Ni, Fe, Pd, or two or more thereof.

4. The hydrogen storage material according to claim 1, wherein in a hydrogen storage/release measurement under an applied hydrogen pressure of vacuum to 10 MPa, a measurement temperature of 60° C., and a convergence time of 30 minutes, the hydrogen storage material stores a greater amount of hydrogen as the applied hydrogen pressure increases without formation of a plateau.

5. A method for producing a hydrogen storage material comprising a crystalline Al phase and a crystalline $TiH_2$ phase each having a maximum length of 200 nm or less and dispersed in an amorphous phase containing an Al—Mg alloy, comprising:
mixing $AlH_3$, $MgH_2$, and $TiH_2$ to prepare a mixed powder:
ball-milling the mixed powder in a hydrogen atmosphere for 60 to 600 minutes while applying a force of 5G to 30G (in which G is gravitational acceleration) to prepare a milled product: and
dehydrogenating the milled product to obtain the hydrogen storage material.

6. The method according to claim 5, wherein in mixing $AlH_3$, $MgH_2$, and $TiH_2$, a weight ratio of the $AlH_3$ to a total of the $MgH_2$ and the $TiH_2$ is 55/45 to 95/5, and a weight ratio of the $MgH_2$ to the $TiH_2$ is 1/9 to 9/1.

7. The method according to claim 5, wherein in mixing $AlH_3$, $MgH_2$, and $TiH_2$, a metal particle having a maximum diameter of 500 nm or less is further added.

8. A method according to claim 7, wherein the metal particle contains Ni, Fe, Pd, or two or more thereof.

9. The method according to claim 7, wherein a weight ratio of the $AlH_3$ to a total of the $MgH_2$, the $TiH_2$, and the metal particle is 55/45 to 95/5.

10. The method according to claim 5, wherein the hydrogen atmosphere has a hydrogen pressure of 0.1 to 2 MPa.

* * * * *